United States Patent [19]

Stumpf et al.

[11] 4,240,912

[45] Dec. 23, 1980

[54] IMMERSION DIALYZER

[75] Inventors: Albert Stumpf, Pocking; Jan Strejcek, Iffeldorf, both of Fed. Rep. of Germany

[73] Assignee: Boehringer Mannheim GmbH, Mannheim-Waldhof, Fed. Rep. of Germany

[21] Appl. No.: 33,363

[22] Filed: Apr. 25, 1979

Related U.S. Application Data

[63] Continuation of Ser. No. 845,516, Oct. 26, 1977, abandoned.

[30] Foreign Application Priority Data

Nov. 5, 1976 [DE] Fed. Rep. of Germany ....... 2650730

[51] Int. Cl.$^3$ .............................................. B01D 13/00
[52] U.S. Cl. .............................. 210/321.2; 210/433.2; 73/421 B
[58] Field of Search ...................... 55/16, 158; 210/22, 210/23 R, 23 F, 321, 433 M

[56] References Cited

U.S. PATENT DOCUMENTS

| 3,716,143 | 2/1973 | Clark | 210/321 R |
| 3,830,106 | 8/1974 | Gardiner et al. | 73/421 B |
| 3,862,576 | 1/1975 | Pogorski | 55/16 X |

Primary Examiner—Ferris H. Lander
Attorney, Agent, or Firm—Sprung, Felfe, Horn, Lynch & Kramer

[57] ABSTRACT

An immersion dialyzer which comprises a removable dialysis head including a membrane holder, at least one inlet canal and a return canal. A holder tube is removably connectable to the dialysis head and includes therein at least one inlet pipe removably connectable to the inlet canal and a return pipe removably connectable to the return canal. A removable membrane is stretchable over the dialysis head, and a closure is provided for the holder tube.

15 Claims, 5 Drawing Figures

IMMERSION DIALYZER

This is a continuation of application Ser. No. 845,516, filed Oct. 26, 1977, and now abandoned.

The present invention relates to an immersion dialyser which can be immersed directly into the medium to be dialyzed and which can preferably be sterilized.

For the determination of substrates and of other dissolved substances in sterile media which are present in a reactor, a storage vessel, a fermenter or the like, it is generally necessary to take samples which, on the one hand, reduce the volume of the medium to be determined and, on the other hand, give rise to the danger that the medium becomes contaminated or infected, infection frequently resulting in expensive losses.

Various systems have already been described and used for sterile sampling (G. L. Solomons, "Materials and Methods in Fermentation", pub. Academic Press, London, New York, 1969).

So long as a large volume of the medium is available, it is acceptable to withdraw the samples necessary for analyses, although a latent danger of infection always exists. However, it is more difficult when samples must be withdrawn from a comparatively small batch several times per day for a comparatively long time since, in such cases, frequent analyses are forbidden because of the automatic reduction of the volume of the medium.

Thus, it is an object of the present invention to provide a dialyzer which is especially useful for analytical purposes, which does not reduce the volume of the medium and which reduces the danger of infection to a minimum.

This object is achieved by the immersion dialyzer provided according to the present invention, which can be incorporated into or introduced into a vessel in the manner of a probe and which can be sterilized before or after incorporation into a vessel.

Thus, according to the present invention, there is provided an immersion dialyzer comprising a removable dialysis head with a membrane holder, at least one inlet canal and a return canal; a holder tube removably connected to the dialysis head in which holder tube are arranged at least one inlet pipe removably connected with the inlet canal and a return pipe removably connected with the return canal; a removable membrane stretched over the dialysis head; and closure means for the holder tube.

The front side of the dialysis head can be flat and possibly provided with a raised edge region but preferably has a conically shaped and, more preferably, a rounded or rotation paraboloid-like shaped tip. For the better distribution of a buffer solution in contact with the membrane, the tip is preferably provided with longitudinal and transverse grooves and, more preferably, with a spiral groove with a rounded base running up to the tip which connects the inlet canal with the return canal.

The dialysis head is made from an inert and sterilizable material, preferably from a synthetic resin and especially from polytetrafluoroethylene. On its lower end, the dialysis head is provided with annular grooves which permit a tight and firmly-seated connection of the dialysis head with the holder tube.

The front end of the dialysis head has a membrane holder in the form of one or more annular grooves running round the circumference of the dialysis head into which can be placed rubber O-rings which secure the dialysis membrane drawn over the tip of the dialysis head.

Through the dialyzer head extend inlet and return canals which terminate at different positions of the tip of the dialysis head so that a buffer solution passing by the dialysis membrane contacts a membrane surface area which is as large as possible. The ends of the inlet and return canals can be provided with threads for the screw connection of the inlet pipe and of the return pipe, these pipes being passed through the holder tube and closure means provided with appropriate passages for the pipes. On the ends of these inlet and return pipes there are fixed rubber or synthetic resin tubes, preferably tygon tubes, by means of which the immersion dialyzer is connected with an appropriate analysis device, for example an automatically operating analyzer.

According to a preferred embodiment of the present invention, the dialysis head is provided with an external thread onto which can be screwed a protective grid made of an inert sterilizable material and preferably of stainless steel, so that the sensitive dialysis membrane is protected against damage. For storage purposes, over this protective grid there can be pushed a rubber cap provided with a bead in order to ensure that the membrane does not dry out.

The inlet and return canals and the inlet and return pipes connected therewith preferably have an inner diameter of 0.5 to 3 mm. and more preferably of about 1 mm. The spiral groove provided on the tip of the dialysis head preferably has a depth of 1 mm. and a breadth of 1.5 mm. and is so made that it does not have any sharp edges which could damage or destroy the sensitive dialysis membrane.

The holder tube, the inlet pipes or the return pipe are made from an inert, sterilizable material and preferably from stainless steel, whereas the closure means can be made from any appropriate material, for example a synthetic resin.

It is, however, important that only those materials are employed for the production of the immersion dialyzer which can be subjected to a sterilization treatment, can preferably withstand temperatures of up to 150° C. and are stable to oxidation and corrosion.

The longitudinal or transverse grooves provided on the tip of the dialysis head and the spiral groove can be milled in, injection molded, turned or pressed in. The breadth and the number of the windings of the spiral grooves is responsible for the dialysis yield since hereby the largest possible surface area of the dialysis membrane comes into close contact with the buffer solution passing by it.

The tubes connected with the inlet and return pipes preferably have an inner diameter of 0.7 to 0.8 mm. and must withstand the sterilization pressure, which can be up to 1.5 ats.

For a better understanding of the present invention, reference is made to the accompanying drawings, in which.

Figure 1:
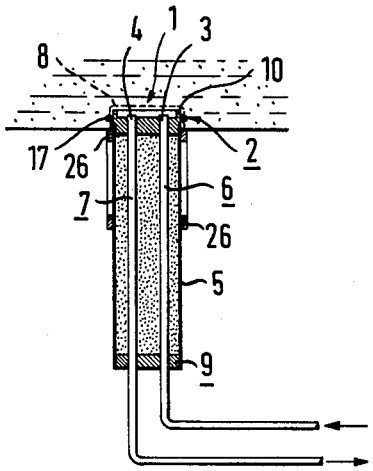
FIG. 1 is a schematic sectional view of a first embodiment of the immersion dialyzer according to the present invention.

FIG. 1 illustrates an embodiment of the immersion dialyzer according to the present invention which is fixed, with the help of holding means 26, onto a fermenter or a by-pass. The immersion dialyzer comprises a dialysis head 1 which is provided with a raised edge region 10 over which is stretched a membrane 8. The membrane 8 is laid round over the edge region and a part of the dialysis head and is firmly held on to the dialysis head with the help of a rubber ring 17. Into the dialysis head 1 there are incorporated, in a spaced apart relationship, and inlet canal 3 and a return canal 4, through which the buffer solution necessary for the dialysis flows in and out. Since the membrane 8 is in direct contact with the medium to be analyzed, all dialyzable materials are, without reduction of the volume of the medium, withdrawn via the immersion dialyzer and can then be transferred to an analysis device. The buffer solution is fed through an inlet pipe 6 into an inlet canal 3 and withdrawn through a return canal 4 and a return pipe 7. The dialysis head is fixed with the help of rubber seals (not illustrated in FIG. 1) on to a holder tube 5, the end of which remote from the dialysis head is provided with closure means 9, for example a closure stopper, through which are passed the inlet and return pipes 6 and 7.

In the case of this embodiment, under the membrane there is formed a small buffer chamber which, via the inlet and return canals and the inlet and return pipes, is connected with an analysis device, for example an Eppendorff photometer. After passage through a reaction coil, there can, for example, be quantitatively determined the glucose taken up by the dialysis procedure without it being necessary to take samples in a laborious manner.

Figure 2:
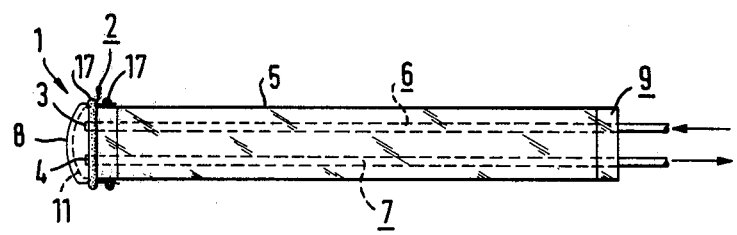
FIG. 2 is a schematic sectional view of a second embodiment of the immersion dialyzer according to the present invention.

FIG. 2 shows a schematic view of a second embodiment of the immersion dialyzer according to the present invention which comprises a flat dialysis head 1 provided with a domed metal sieve 11 over which the membrane 8 is stretched. The membrane is, in turn, fixed with the help of rubber O-rings 17 on to the membrane holder 2 and the dialysis head 1. By means of this metal sieve, the membrane can be more tautly stretched than is possible in the case of the embodiment illustrated in FIG. 1 so that a more constant dialysis yield can also be achieved.

Figure 3:
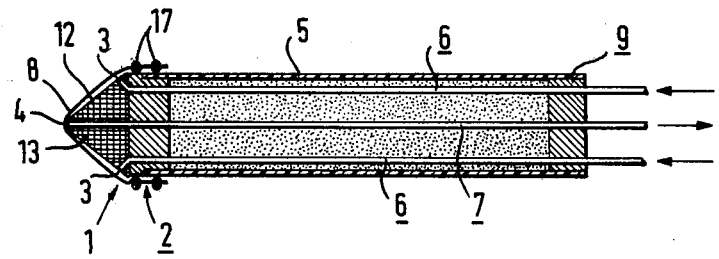
FIG. 3 is a schematic sectional view of a third embodiment of the immersion dialyzer according to the present invention.

FIG. 3 shows a third embodiment of the immersion dialyzer according to the present invention. The dialysis head of this embodiment has a conically-shaped tip 12 which is provided with transverse and longitudinal grooves 13, these grooves bringing about a more uniform distribution of the buffer over the surface of the membrane. The buffer solution necessary for the dialysis is fed in via oppositely-lying inlet pipes 6 into the inlet canals 3 and from there via the grooves to the Teflon tip from whence the buffer solution is again withdrawn via the return canal 4 and the return pipe 7. In this case, too, the dialysis membrane 8 is tautly fixed on the dialysis head 1 with the help of the rubber O-rings 17. In the case of this embodiment, an even more uniform dialysis yield can be achieved and the immersion dialyzer is substantially more stable, which simplifies its sterilization.

Figure 4:
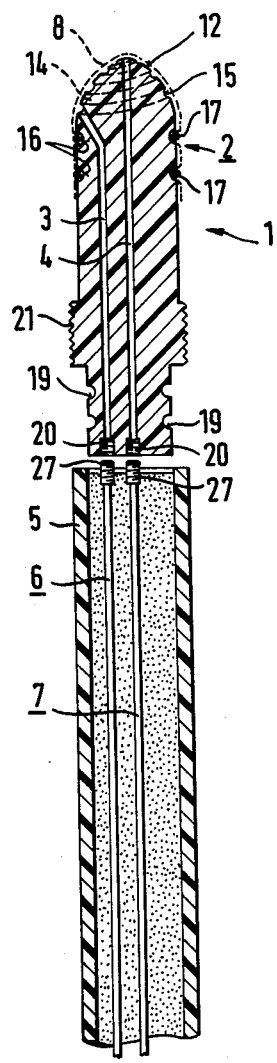
FIG. 4 is a schematic sectional view of the preferred embodiment of the immersion dialyzer according to the present invention.

Finally, FIG. 4 shows the preferred embodiment of the immersion dialyzer according to the present invention in a schematic exploded sectional view. The dialysis head 1, which is preferably made of polytetrafluoroethylene, has a rounded tip 12 provided with a spiral groove 14 with a rounded base 15 running towards the tip. This spiral groove connects the inlet canal 3 with the return canal 4 and advantageously has 3 or 4 windings. The spiral groove can be milled in, injection molded, turned or pressed in but, nevertheless, preferably has rounded edges in order that damage to the sensitive membrane is avoided. The membrane 8 is placed over the tip 12 of the dialysis head and tightly secured to the dialysis head with the help of rubber O-rings 17 placed in the annular grooves 16. The rear end of the dialysis head 1 is provided with annular grooves 19 into which rubber O-rings can be placed which make possible a tight connection of the dialysis head 1 with the holder tube 5. The ends of the inlet canal 3 and of the return canal 4 are provided with threads 20 into which can be screwed corresponding threads 27 of the inlet pipe 6 and of the return pipe 7, respectively. The inlet and return pipes 6 and 7 pass through the holder tube 5 and through the closure stopper 9 which is provided with tightly fitting tube passages 24. These pipes are preferably made of stainless steel and advantageously have a diameter of 1 mm., whereas the pipe passages 24 have a diameter of 1.2 mm. The closure stopper 9 is provided with an annular groove 25 for the reception of a sealing rubber O-ring.

The spiral groove 14 incorporated into the tip 12 of the dialysis head passes the buffer, in an aimed manner, over the dialysis head. Air is thereby forced out so that no air bubbles can be formed, which results in a constant dialysis yield. The dialyzer is stable towards a sterilization and can be introduced or incorporated directly into a fermenter.

Figure 5:
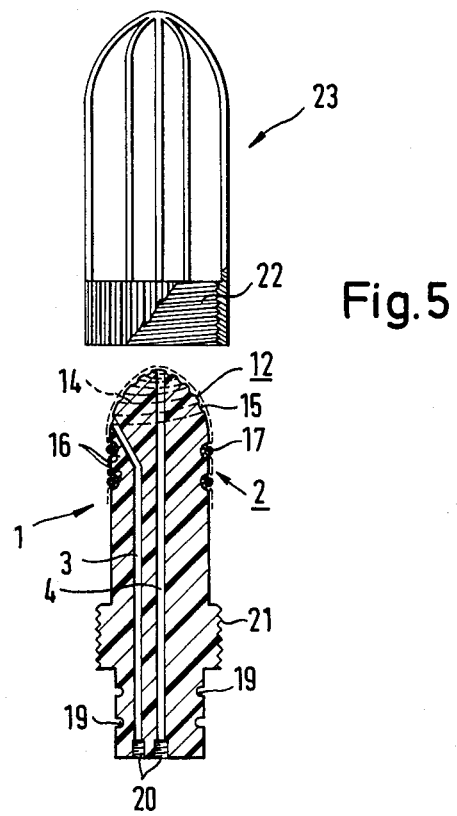
FIG. 5 is a view of a dialysis head and of a protective grid suitable therefor.

FIG. 5 shows the dialysis head 1 provided with an outer thread 21 and a protective grid 23 suitable therefor. The protective grid 23 can be firmly screwed, with the help of an internal thread 22, onto the dialysis head 1 and, in this manner, protects the sensitive dialysis membrane. Over the protective grid 23 there can be pushed an appropriately shaped rubber cap which should sit as tightly as possible in order to prevent a running off or evaporation of the disinfection solution in the presence of which the membrane is preferably stored.

The dialysis membrane used can be made of any suitable material, such as cellulose or a synthetic resin and especially "Cellophane". It is preferable to use a "Cellophane" dialysis tube with a surface breadth of 75 to 85 mm. and a diameter of 50 mm. (obtainable from the Kalle, subsidiary of Hoechst A.G., Wiesbaden). The pore size of the membrane depends upon the material to be dialyzed and is preferably 4 to 6 nm.

The immersion dialyzer according to the present invention can be dipped into the medium to be analyzed like a probe and is preferably directly incorporated into the fermenter.

When using the immersion dialyzer, all dialyzable materials present in the medium to be analyzed are taken up via the dialyzer head and the membrane into a buffer current of appropriate composition. The rate of flow of the buffer stream is regulated in such a manner that the substances to be determined are present on both sides of the membrane in dialysis equilibrium. The "saturated" buffer current is transported to the actual analysis system and, possibly after reaction with an indicator, subsequently analyzed. In this way, practically all materials which can be separated from the medium by dialysis can be passed to an analysis.

As a result, no volume losses occur, there is no danger of infection, difficult sample taking operations are unnecessary and the preparation of samples, such as filtration and centrifuging, are also unnecessary. This represents a considerable advantage in comparison with conventional systems for taking samples since there, in the case of withdrawal of the sample, the problem arises that the tubes and dialysis chamber very quickly become blocked up so that these must be frequently disassembled and cleaned. In the case of the conventional manipulations and also the necessary pumping round, there is a very high danger of infection which, in the case of the immersion dialyzer according to the present invention, no longer exists since it can be sterilized.

By means of the immersion dialyzer according to the present invention, in the case of mycelium-containing (for example *Aspergillus niger*) deposits, the filtration is unnecessary which previously caused very great difficulties and, without supervision, also could not be carried out over the course of a short period of time.

The immersion dialyzer according to the present invention guarantees a continuous taking of samples without loss of volume and without the danger of infection and can be directly attached to an automatic analyzer. Since it is stable towards sterilization, the immersion dialyzer can be sterilized, for example by sterilizing the immersion dialyzer incorporated into a fermenter.

For using the immersion dialyzer, the inlet and return pipes 6 and 7, preferably made of stainless steel, are first screwed on to the dialysis head 1. They are introduced through the holder tube 5, which is made of stainless steel and preferably has a diameter of 19 mm., whereupon the dialysis head is pressed into the holder tube 5. The O-rings laid into the annular grooves 19 thereby ensure a good sealing and a firm seating.

The closure stopper is then put on, which is also fixed in the holder tube 5 with the help of an O-ring laid into the annular groove 25, care being taken that the inlet and return pipes do not interlace or cross over.

Then, with the help of tubes, preferably Tygon tubes, with an inner diameter of 0.7 to 0.8 mm., the immersion dialyzer is connected with an analysis device.

The dialysis membrane is cut to a size of 6×6 cm. and softened in a 0.1% disinfection solution, for example a sodium azide solution, softening taking place over the course of at least one hour. However, it can be carried out for an unlimited period of time. For pulling over, the membrane is placed squarely in the middle of the dialysis head. It is then pulled uniformly downwards, taking care to avoid creasing or folding the surface of the membrane. The membrane stretches sufficiently. The O-rings are now carefully rolled on from the direction of the tip of the dialyzer head, over the membrane into the annular grooves 16, the membrane thereby being in a stretched condition. Excess membrane is then removed below the lower O-ring, whereafter the protective grid 23 is screwed on.

In the case of comparatively long non-use, a rubber cap filled with a 0.1% sodium azide disinfection solution is pushed over the protective grid in order to avoid a drying out of the membrane.

The membrane can be sterilized several times and, after a possible damaging, can be changed without difficulty.

When assembling the immersion dialyzer, the threads 20 and 27 are preferably sealed with the help of sealing materials and especially with a polytetrafluoroethylene band.

When the immersion dialyzer is to be sterilized in an incorporated state, together with the fermenter, the membrane must be protected against bursting by the superimposition of pressure. This takes place by providing the inlet pipe 6 with a connection and connecting the return pipe 7 with the fermenter chamber. In the case of sterilization, the pressure on both sides of the membrane builds up equally strongly so that there is no danger of damaging the membrane. When sterilization is finished and after the pressure has again been relieved, the superimposed pressure is removed, whereupon the immersion dialyzer is, with the help of tubes, again connected to the continuously operating analyzer.

Before the sterilization, these tubes must be filled with liquid at the lowest possible pump rate in order to prevent the formation of a pillow of air.

The immersion dialyzer according to the present invention can be sterilized not only in a liquid but also with steam at a temperature of about 120° C.

It will be understood that the specification and examples are illustrative, but not limitative of the present invention and that other embodiments within the spirit and scope of the invention will suggest themselves to those skilled in the art.

What is claimed is:

1. An immersion dialyzer, comprising: an elongated holder tube having a central longitudinal axis and including therein at least one inlet pipe, at least one return pipe and closure means at one end of the tube; and a dialysis head comprising a dome-shaped working surface extending symmetrically about said central longitudinal axis and having a spiral groove therein, at least one inlet canal and at least one return canal, wherein the inlet canal and return canal terminate at different locations along the spiral groove in the working surface of the dialysis head thereby connecting the canals, a membrane stretchable over the dialysis head to cover the working surface thereof and means for releasably holding the membrane in said stretched state on the dialysis head; and means for removably mounting the dialysis head on the other end of the holder tube and releasably connecting the inlet canal to the inlet pipe and the return canal to the return pipe.

2. An immersion dialyzer according to claim 1, wherein the spiral groove has one end at the tip of the dome shaped working surface and wherein one of the canals extends along the longitudinal axis of the head and terminates at the one end of the spiral groove and the other canal terminates at the other end of the spiral groove.

3. An immersion dialyzer as claimed in claim 1, wherein the spiral groove has at least three and no more than four windings.

4. An immersion dialyzer as claimed in claim 1, wherein the dialysis head is composed of a synthetic resin.

5. An immersion dialyzer as claimed in claim 4, wherein the synthetic resin is polytetrafluoroethylene.

6. An immersion dialyzer as claimed in claim 1, wherein the means for holding the membrane on the head comprises at least one annular groove incorporated into the dialysis head and a rubber O-ring receivable in each annular groove.

7. An immersion dialyzer as claimed in claim 1, wherein the removable mounting means comprises annular grooves on the end of the head opposite the working surface configured to be received in the holder tube and sealing rubber O-rings in the annular grooves to effect a tight connection.

8. An immersion dialyzer as claimed in claim 1, wherein the means removably connecting the inlet and return canals in the dialysis head comprises engagable screw threads thereon and on the inlet and return pipes.

9. An immersion dialyzer as claimed in claim 1, wherein the dialysis head has an external thread thereon and further comprising a protective grid having a corresponding internal thread for mounting same on the head.

10. An immersion dialyzer as claimed in claim 9, wherein the protective grid is composed of stainless steel.

11. An immersion dialyzer as claimed in claim 1, wherein the inlet and return pipes are composed of stainless steel.

12. An immersion dialyzer as claimed in claim 1, wherein the inlet and return canals and the inlet and return pipes have inner diameters of 0.5 to 3 mm.

13. An immersion dialyzer as claimed in claim 1, wherein the closure means comprises tightly fitting pipe passages for the inlet and return pipes.

14. An immersion dialyzer as claimed in claim 13, wherein the closure means comprises at least one annular groove and a rubber O-ring received therein.

15. An immersion dialyzer as claimed in claim 1, wherein the holder tube is composed of stainless steel.

* * * * *